J. W. FAY.
ELECTRODE.
APPLICATION FILED JUNE 24, 1921.
1,416,183.
Patented May 16, 1922.
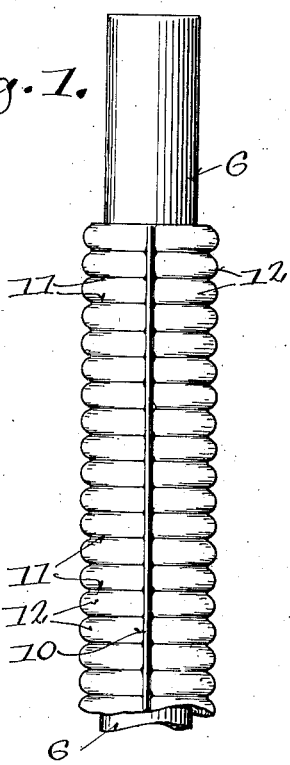
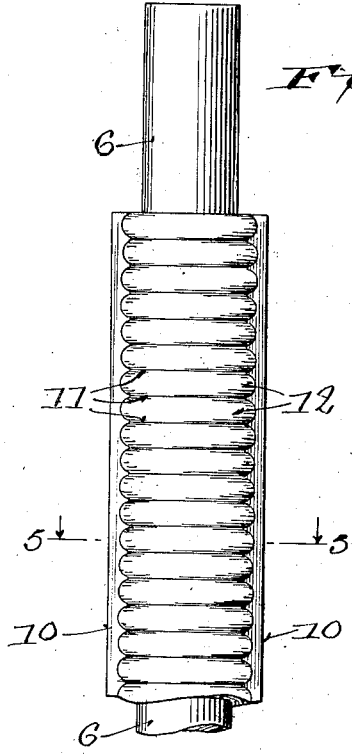
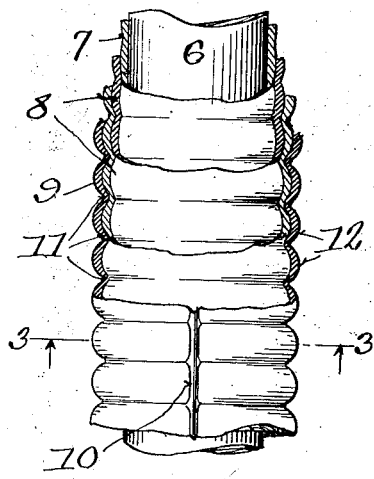
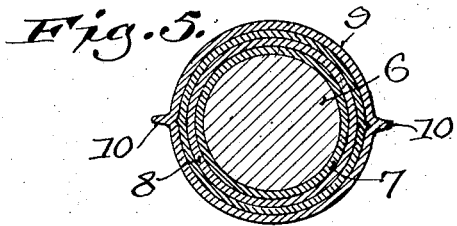
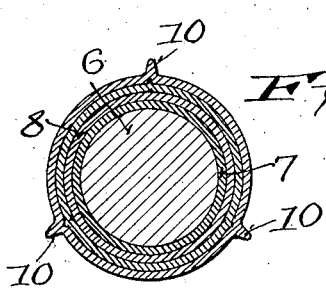
INVENTOR.
BY JOSEPH W. FAY
ATTORNEY.

UNITED STATES PATENT OFFICE.

JOSEPH W. FAY, OF MILWAUKEE, WISCONSIN, ASSIGNOR TO SEAMWELD EQUIPMENT COMPANY, OF MILWAUKEE, WISCONSIN, A CORPORATION OF WISCONSIN.

ELECTRODE.

1,416,183.        Specification of Letters Patent.    Patented May 16, 1922.

Application filed June 24, 1921. Serial No. 480,168.

*To all whom it may concern:*

Be it known that I, Joseph W. Fay, a citizen of the United States, residing in the city of Milwaukee, county of Milwaukee, and State of Wisconsin, have invented a certain new and useful Improvement in Electrodes, of which the following is specification.

This invention relates to electrodes used for electric welding purposes and more particularly to the insulating coating for the electrode.

In electrodes of the type shown in my United States Letters Patent No. 1,359,976, dated November 23, 1920, in which paper insulation is cemented to the metal core of the electrode, it is very essential for efficient operation that the insulation burn off evenly and be completely consumed, that is, the insulation should not fall from the metallic core in a partially burned condition. While the annular groove construction, such as shown in the patent above referred to, assists in securing an even burning of the insulation, I find that this may be made more positive by providing a plurality of radially extending ribs on the insulation in conjunction with the grooves, for while the section of paper may become loosened by a burning in the line of depression, the ribs prevent this section falling off in partially consumed condition, because said section is wholly consumed when its ribbed portion has been burned off.

The invention further consists in the several features hereinafter set forth and more particularly defined by claims at the conclusion hereof.

In the drawings: Fig. 1 is an elevation view of a partial length of electrode embodying the invention; Fig. 2 is a similar view with parts broken away and parts shown in section; Fig. 3 is a section taken on the line 3—3 of Fig. 2; Fig. 4 is a view similar to Fig. 1 showing an electrode provided with a pair of ribs; Fig. 5 is a section taken on the line 5—5 of Fig. 4.

Any suitable material may be used for the electrode proper, that is, the metallic core, and it may be of any suitable shape, diameter and length. I prefer for the purpose a circular metal bar 6. The entire length of that portion of the bar which is to be deposited on the seam to be welded is enclosed in a coating of heat-resisting cement 7 of any suitable kind, though so-called asbestos cement is preferred. Upon this coating of cement I apply a thick coating of paper 8 which may be formed in several layers. The surface of the paper is materially roughened in any suitable manner so as to form corrugations 9 positioned close together and equally spaced, these corrugations forming alternating elevations and V-shaped depressions in the coating along the length of the bar. After the corrugations are formed longitudinally extending ribs 10 are pressed out of the paper coating and two or more of such ribs may be used, as shown in Figs. 3 and 5. These ribs thus serve to break up the corrugations at two or more points in each section of corrugation so that while the coating may be burned through at the depression, as 11, the whole adjacent corrugation 12 will not fall off from the electrode in a partially burned condition because the ribs have to be burned through and they do not burn through until this whole section 12 has been consumed, and thus the insulating covering of the electrode burns evenly and does not interfere with the welding process accomplished by the melting of the metal bar. As in my former patent, I prefer to saturate the paper with a sodium silicate solution and this provides a suitable binder between the paper and the coating of cement. The electrode is designed for machine welding and hand welding.

I desire it to be understood that this invention is not to be limited to any specific form or arrangement of the parts except in so far as such limitations are specified in the claims.

What I claim as my invention is:

1. An electrode for welding purposes, comprising a bar of metal, a coat of cement on said bar, and an insulating paper covering over the cement, said paper having transversely extending depressions therein and longitudinally extending ribs.

2. An electrode for welding purposes, comprising a bar of metal, a coat of cement on said bar, and a thick coat of paper covering said cement, said paper being corrugated transversely and provided with longitudinally extending ribs.

3. An electrode for welding purposes, comprising a bar of metal, a coat of cement on said bar, and a thick coat of paper covering said cement, said paper having depressions in the form of transversely extending V-shaped grooves extending equally spaced from one end of the paper coat to the other, said paper also having a plurality of longitudinally extending ribs interrupting said grooves.

4. An electrode for welding purposes, comprising a bar of metal, a coat of cement on said bar, a coat of paper covering said cement, said paper having alternating depressions and elevations along its length, and means for connecting the elevations of adjacent sections together at a plurality of points.

5. An electrode for welding purposes, comprising a bar of metal, a coat of cement on said bar, a coat of paper covering said cement, said paper having alternating depressions and elevations along its length, and rib portions connecting the elevations of adjacent sections together.

JOSEPH W. FAY.